United States Patent
Wu

(10) Patent No.: US 10,012,142 B2
(45) Date of Patent: Jul. 3, 2018

(54) ROTARY ENGINE WITH EXPLOSION CHAMBER POCKETS IN THE CYLINDER AND POWER WHEEL

(71) Applicant: Rong-Jen Wu, Taoyuan (TW)

(72) Inventor: Rong-Jen Wu, Taoyuan (TW)

( * ) Notice: Subject to any disclaimer, the term of this patent is extended or adjusted under 35 U.S.C. 154(b) by 218 days.

(21) Appl. No.: 15/147,058

(22) Filed: May 5, 2016

(65) Prior Publication Data

US 2017/0276068 A1 Sep. 28, 2017

(30) Foreign Application Priority Data

Mar. 24, 2016 (TW) .............................. 105109174 A

(51) Int. Cl.
| | |
|---|---|
| *F02B 55/14* | (2006.01) |
| *F02B 55/02* | (2006.01) |
| *F02B 53/12* | (2006.01) |
| *F02B 53/04* | (2006.01) |
| *F02B 53/10* | (2006.01) |
| *F02B 75/02* | (2006.01) |

(52) U.S. Cl.
CPC .............. *F02B 55/14* (2013.01); *F02B 53/04* (2013.01); *F02B 53/10* (2013.01); *F02B 53/12* (2013.01); *F02B 55/02* (2013.01); *F02B 75/02* (2013.01); *F02B 2075/023* (2013.01)

(58) Field of Classification Search
CPC ..... F02B 2075/023; F02B 55/02; F02B 55/14
See application file for complete search history.

(56) References Cited

U.S. PATENT DOCUMENTS

| | | | | |
|---|---|---|---|---|
| 3,306,269 A | * | 2/1967 | Dimmock, Jr. ........... | F01C 1/44 123/227 |
| 4,089,305 A | * | 5/1978 | Gregg ..................... | F02B 53/06 123/244 |
| 4,819,594 A | * | 4/1989 | Tsakiroglou ............ | F02B 75/02 123/201 |
| 5,251,595 A | * | 10/1993 | Wei-Min ................. | F02B 55/02 123/223 |

\* cited by examiner

Primary Examiner — Mary A Davis
(74) Attorney, Agent, or Firm — Rosenberg, Klein & Lee

(57) ABSTRACT

A rotary internal combustion engine includes a cylinder seat and a power wheel. The cylinder seat has a circular cylinder, at least one first explosion chamber disposed on a cylinder wall, and an ignition system, a fuel supply system, a compression assembly, an exhaust and an intake installed thereon for each respective first explosion chamber. The power wheel is slidably coupled to the circular cylinder, and has at least one compression chamber and a second explosion chamber disposed adjacent thereto and when rotated provides connection to the first explosion chamber. As a result of rotation of the power wheel, air and fuel gas are compressed in the compression chamber, collected into the first and second explosion chambers, and then ignited by the ignition system to produce a high explosive yield, so that the power wheel is rotated constantly in a single direction to provide high-efficiency kinetic energy.

8 Claims, 6 Drawing Sheets

ROTARY ENGINE WITH EXPLOSION CHAMBER POCKETS IN THE CYLINDER AND POWER WHEEL

FIELD OF THE INVENTION

The present invention generally relates to a rotary internal combustion engine, particularly to the rotary internal combustion engine that uses an explosive fuel gas to drive a power wheel to rotate in a single direction constantly in a natural and continuous manner, so as to provide high-efficiency kinetic energy, smooth and clean exhaustion, and diversified fuel supply.

BACKGROUND OF THE INVENTION

At present, most conventional internal combustion engines generate kinetic energy by moving a piston reciprocally and using components such as link rods or crankshaft to achieve the effect, and there are two common types of internal combustion engines, respectively; a two-stroke internal combustion engine and a four-stroke internal combustion engine.

In the two-stroke internal combustion engine, a fuel gas is compressed when the piston ascends, and an ignition system is provided for igniting the compressed fuel gas to produce an explosion when the piston ascends to a top dead center. When the piston descends to apply a force to a cam, the crankshaft is linked to rotate and generate kinetic energy. In other words, when the piston is moved reciprocally once, the crankshaft is rotated for a round (360 degrees) to generate kinetic energy for one time. When the piston descends, a top end of the piston passes through an exhaust port first and then descends and passes through the intake port. Now, the compressed fuel gas in a crankshaft box enters into the cylinder, gets ready for the next cycle of combustion, and exhausts some of the waste gas produced after the combustion. When the piston descends to a bottom dead center, the crankshaft driven by the piston through the link rod drives the piston to ascend again by a reverse inertia force in the rotation, and the fuel gas entering from the intake port into the cylinder is pushed upwardly and compressed to produce another explosion and a cycle of generating kinetic energy.

In summation, the two-stroke internal combustion engine does not come with an intake valve, an exhaust valve or a related transmission device or component, so that the structure is relatively simpler, but its application still has the following drawbacks:

1. Since there is no driving device for exhaustion, therefore when the fuel gas passes through the intake port and enters into the cylinder, only a portion of the waste gas produced by the explosion and combustion of the fuel gas and stored in the crankshaft box is compressed and exhausted to the outside, but most of the waste gas still remains in the cylinder and mixes with the recently entered fuel gas. Therefore, the fuel gas cannot be combusted completely, and the exhausted gas fails to meet the requirements of environmental protection.

2. When the piston ascends to compress the fuel gas, a portion of the waste gas originally stored in the cylinder is compressed to the exhaust port and exhausted to the outside, but a portion of the compressed fresh fuel gas is also exhausted altogether, and thus causing a waste of fuel gas (or energy source).

3. The waste gas produced by the explosion and combustion of the fuel gas in the cylinder cannot be exhausted completely and a large quantity of waste gas still remains and mixes directly with the fresh fuel gas provided for the next combustion cycle. Therefore, when the fuel gas mixed with the waste gas is exploded and combusted, the quantity of kinetic energy is smaller and the expected using effect cannot be achieved.

4. When the piston ascends from the bottom dead center to the top dead center (or the crankshaft rotates 180 degrees), the compressed fuel gas is exploded and combusted, so that the piston will descend instantaneously to produce kinetic energy once (Now, the crankshaft has another rotation of 180 degrees). After the piston descends to the bottom dead center, the piston will ascend with the rotation of the crankshaft to compress the fuel gas again and prepare for the next production of kinetic energy, and the reciprocal two-stroke internal combustion engine can provide kinetic energy through such cycle continuously. However, this method of generating kinetic energy has the drawbacks of wasting energy source and incurring low efficiency. As to the operability of the crankshaft and the piston, the piston ascends to the top dead center after the fuel gas is exploded and combusted, and then the piston will descend immediately to apply a force to the crankshaft and drives the crankshaft to rotate, so as to generate the kinetic energy. After the crankshaft rotates 180 degrees to provide kinetic energy, the piston will rotate for 180 degrees from the bottom dead center in a reverse direction, so as to ascend and compress the fuel gas and the piston can no longer apply a force to the crankshaft. Although the crankshaft still continues its rotation of 180 degrees, the rotation mainly relies on the reverse inertia force produced by the previous rotation of 180 degrees but not the driving force continuously provided by the piston. The piston does not provide the driving force to the crankshaft in both the upward and downward strokes, and it just provides the driving force in the downward rotary direction only. Obviously, the kinetic energy generated by the rotation of the crankshaft can achieve at most half of the expected effect, and the efficiency is low. In addition, the piston at the top and bottom dead centers performs a 180-degree reciprocal motion instantaneously, not just adversely affecting the effect of the inertia force, but also causing a pulse pause that retards the motion speed when the piston is situated at the top and bottom dead centers. When the piston ascends to compress the fuel gas, the piston will be retarded by the resistance of the fuel gas to reduce the ascending speed and pressure. In practical application, the rotation of the crankshaft linked with the piston will be affected, and a large quantity of the generated kinetic energy will be consumed and wasted. Such conventional two-stroke internal combustion engine cannot provide high-efficiency kinetic energy.

On the other hand, the four-stroke internal combustion engine improves the issue of having a large quantity of waste gas remained in the cylinder after the exposition and combustion of the fuel gas in the two-stroke internal combustion engine. The four-stroke internal combustion engine also generates kinetic energy by the reciprocal motion of the piston linked to the crankshaft. The difference between the four-stroke and two-stroke internal combustion engines mainly resides on that the four-stroke internal combustion engine moves the piston reciprocally for two times, and the crankshaft rotates for two rounds (or 720 degrees) before generating the kinetic energy once. In other words, when the intake valve and exhaust valve are closed, the piston compresses the fuel gas in the cylinder during the first-time ascending stroke. When the piston ascends to the top dead center, the fuel gas is ignited by the ignition system to exploded, and then the first-time descending stroke will take place immediately and the crankshaft will be linked and rotated by the applied force to generate kinetic energy for one time. When the piston descends to the bottom dead center in the first-time descending stroke, the second-time ascending stroke takes place by the reverse inertia force of the crankshaft. Since the intake valve is still closed, and the exhaust valve is switched to an open status, therefore the waste gas remained from the previous explosion and combustion, and the ascending piston compresses and exhausts the waste gas from the exhaust valve to the outside. After the piston ascends to the top dead center for the second time, the second-time descending stroke take place automatically by the reverse inertia force of the crankshaft. In the meantime, the exhaust valve is switched to the closed status, and the intake valve is switched to the open status, so that the fresh fuel gas can enters directly from the intake valve into the cylinder, and when the piston descends to the bottom dead center, another cycle of ascending the piston to compress the fuel gas takes place again by the reverse inertia force.

Undeniably, the aforementioned four-stroke internal combustion engine is capable of exhausting the waste gas produced by the explosion and combustion of the fuel gas to the outside when the piston ascends to compress and exhaust waste gas. As a result, the quantity of the waste gas remained in the cylinder is less (since there is a gap between the cylinder and the cylinder cover, therefore the waste gas produced after the explosion and combustion cannot be exhausted completely, and a portion of the waste gas still remains), and the fuel gas can be combusted more completely, and the exhausted gas can meet the requirements of environmental protection. Since the piston rotates the crankshaft through a linear reciprocal motion to generate kinetic energy, therefore the piston requires a reverse 180-degree motion at the top dead center and the bottom dead center. Obviously, the inertia force has an adverse effect on the aforementioned piston, and the piston situated at the top and bottom dead centers will have a pulse pause, and when the piston ascends, the piston is affected by the resistance of the fuel gas, and the efficiency of generating kinetic energy by the crankshaft will be affected. Therefore, the conventional four-stroke internal combustion engine still cannot provide high-efficiency kinetic energy. Particularly, two strokes are added to the piston in order to successfully exhaust the waste gas produced by the combustion to the outside from the cylinder (In other words, the piston must carry out the reciprocal motion twice, and the crankshaft must be rotated for two rounds). Such internal combustion engine not just wastes the kinetic energy generated by two strokes only, but also fails to comply with the cost-effectiveness (according to the principle of mechanics).

Further, some manufacturers adopt a rotary engine such as the Wankel rotary engine) comprising three parts, respectively: a rotor seat with an elliptical space; a triangular rotor assembly accommodated in the elliptical space of the rotor seat and having a driving gear and a stationary gear engaged with one another; and an eccentric shaft assembly passed through and installed to the rotor assembly, such that the rotor assembly can perform an elliptical motion at the rotor seat. Since the triangular rotor assembly compresses the fuel gas along the curve of the elliptical space of the rotor seat, the rotary engine has the following drawbacks:

1. The complexity, precision, and manufacturing cost of the whole structure are high.

2. The triangular rotor assembly has a less airtight effect with the rotor during the rotation.

3. Since the rotation of the rotor assembly is driven by the rotation of the eccentric shaft assembly, but not integrally rotated according to the inertia motion, therefore the rotation of the rotor assembly is substantially in a parabolic shape of a centrifugal force and must be balance by pulling back the rotating force of the eccentric shaft assembly, and the compression stroke consumes kinetic energy to reduce the efficiency of generating kinetic energy.

4. Since the rotor assembly is a triangular assembly with three sides provided for performing different four-stroke cycles simultaneously, therefore the shape of the rotor assembly cannot be changed to triangular, the compression ratio cannot be improved easily, and the efficiency of generating kinetic energy is low.

SUMMARY OF THE INVENTION

Therefore, it is a primary objective of the present invention to overcome the aforementioned drawbacks by providing a rotary internal combustion engine capable of generating high-efficiency kinetic energy, exhausting waste gas successfully and completely, and providing a diversified fuel supply effect.

To achieve the aforementioned objective, the present invention provides a rotary internal combustion engine comprising a cylinder seat and a power wheel, characterized in that the cylinder seat comprises a circular cylinder, at least one first explosion chamber disposed on a cylinder wall, and at least an ignition system, a fuel supply system, a compression means, an exhaust means and an intake means installed at the external periphery of the cylinder seat corresponsive to each first explosion chamber and communicated with the cylinder; wherein each ignition system is configured to be corresponsive to the first explosion chamber; the power wheel is slidably coupled to the circular cylinder of the cylinder seat, and at least one compression chamber and second explosion chamber are adjacently disposed on the peripheral surface and slidably coupled to one another, and the compression chamber and the second explosion chamber are rotably corresponsive to the first explosion chamber, the fuel supply system, the compression means, the exhaust means and the intake means of the cylinder seat. After the power wheel is turned on to rotate, the air entered into the intake means and the fuel gas supplied by the fuel supply means will be compressed by the compression means in the compression chamber, and then collected into the first explosion chamber and second explosion chamber, and finally ignited by the ignition system for an explosion, and the high explosive yield of the explosion of the compressed fuel gas drives the second explosion chamber to push the power wheel to rotate, so that the power wheel is always in a unidirectional rotation, so as to achieve the effect of providing high-efficiency kinetic energy.

DESCRIPTION OF THE PREFERRED EMBODIMENTS

The technical characteristics, contents, advantages and effects of the present invention will be apparent with the detailed description of a preferred embodiment accompanied with related drawings as follows. It is noteworthy that same numerals are used for representing similar respect elements for simplicity.

Figure 1:
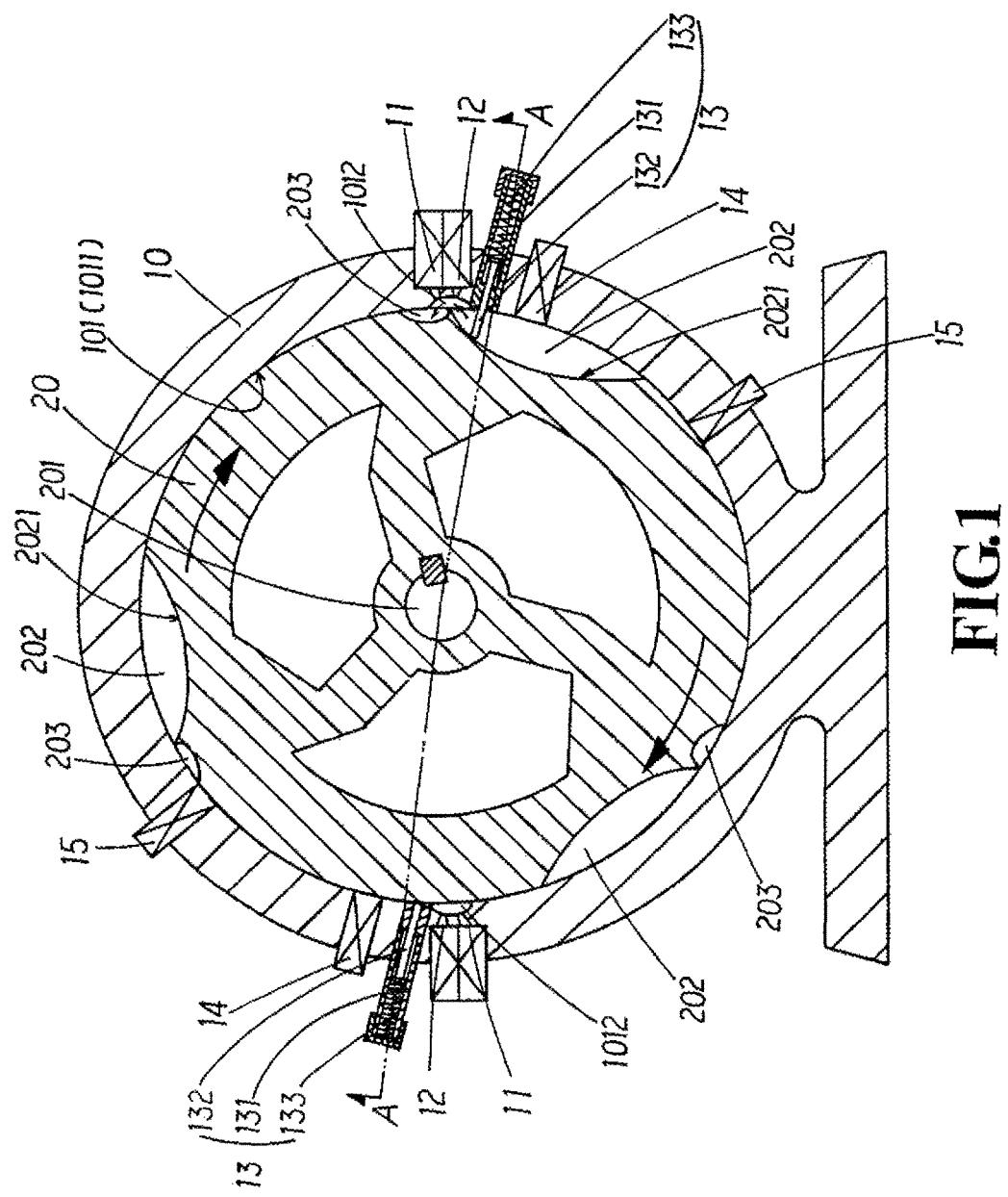
FIG. 1 is a front view of a compression means operated to compress a fuel gas in accordance with an embodiment of the present invention.
Figure 2:
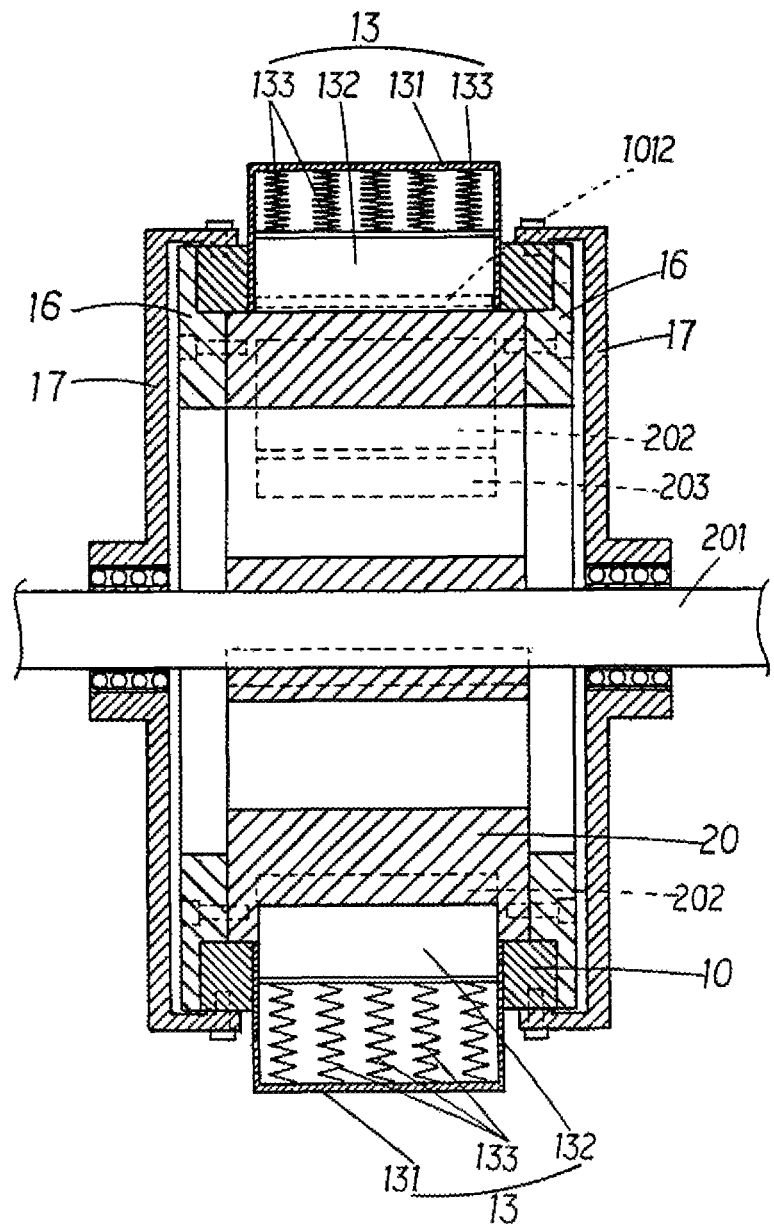
FIG. 2 is a bottom view of Section A-A of FIG. 1.

With reference to FIGS. 1 and 2 for a rotary internal combustion engine of the present invention, the rotary internal combustion engine comprises a cylinder seat 10 and a power wheel 20.

The cylinder seat 10 includes a circular cylinder 101, at least one or more than one inwardly concave first explosion chamber 1012 disposed on the peripheral surface of a cylinder wall 1011, and at least an ignition system 11 (such as a spark plug), a fuel supply system 12 (such as an intake valve, a carburetor, etc), a compression means 13, an exhaust means 14 and an intake means 15 disposed at the external periphery of each first explosion chamber 1012 and corresponsive to the cylinder seat 10 and communicated with the cylinder 101; wherein the ignition system 11 is configured to be corresponsive to the first explosion chamber 1012 disposed on the cylinder wall 1011; the compression means 13 comprises an accommodating body 131, a gas barrier member 132 and an elastic member 133, and the accommodating body 13 is installed at the cylinder seat 10, and an inner end of the accommodating body 13 is communicated with the cylinder wall 1011, and the gas barrier member 132 is movably installed in the accommodating body 131, so that a front end is exposed from the cylinder wall 1011, and the elastic member 133 is accommodated in the accommodating body 131 and elastically pressed at the corresponsive gas barrier member 132, so that the gas barrier member 132 has a forward elastic action force at any time.

The power wheel 20 is concentrically and slidably coupled to the circular cylinder 101 of the cylinder seat 10 in a free rotation manner, and a transmission shaft 201 is installed at the center of the power wheel 20, and at least one or more than one compression chamber 202 and second explosion chamber 203 are disposed adjacent to one another on the peripheral surface of the power wheel 20 and when the compression chamber 202 and the second explosion chamber 203 of the power wheel 20 are rotated, they are corresponsive to each first explosion chamber 1012, fuel supply system 12, compression means 13, exhaust means 14 and intake means 15 of the cylinder seat 10; wherein when the compression chamber 202, the second explosion chamber 203 and the intake means 15 are configured to be corresponsive to one another, fresh air is entered and accommodated; when the compression chamber 202, the second explosion chamber 203 and the fuel supply system 12 are configured to be corresponsive to one another, the fuel gas is inputted and accommodated; and when the compression chamber 202 and the compression means 13 are configured to be corresponsive to each other, the gas barrier member 132 of the compression means 13 will be automatically and elastically pressed into the compression chamber 202 and airtightly coupled to the periphery of the compression chamber 202.

After the power wheel 20 is slidably installed to the circular cylinder 101 of the cylinder seat 10, both sides of the power wheel 20 are sealed by a side cover 16, and the transmission shaft 201 installed at the center of the power wheel 20 and pivotally installed to a positioning frame 17 in a free rotation manner, and the positioning frame 17 is fixed to the cylinder seat 10, so that the power wheel 20 can be rotated smoothly and stably.

The peripheral surface of the power wheel 20 has a compression chamber 202 with a bottom 2021 preferably being a cambered surface, so that when the power wheel 20 is rotated, the gas barrier member 132 of the compression means 13 elastically presses the cambered surface of the compression chamber 202 to achieve the airtight effect.

The compression chamber 202 disposed on the peripheral surface of the power wheel 20 has a volume greater than the sum of the volume of the first explosion chamber 1012 and the volume of the second explosion chamber 203.

Figure 3:
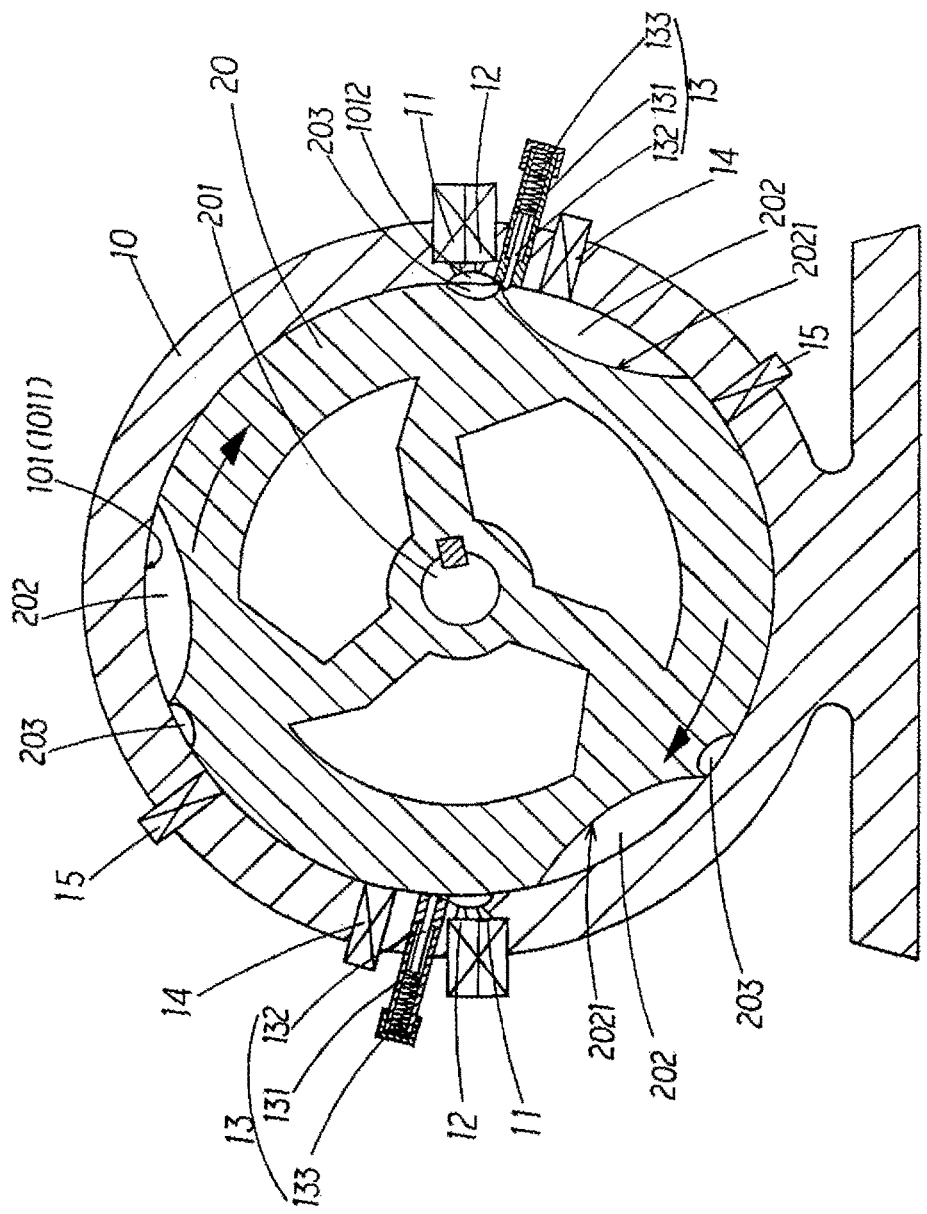
FIG. 3 is a front view of a first explosion chamber operated with respect to a second explosion chamber in accordance with an embodiment of the present invention.

With reference to FIG. 3 for the rotary internal combustion engine of the present invention, the power wheel 20 is slidably installed to the circular cylinder 101 of the cylinder seat 10 in a free rotation manner, and both sides of the power wheel 20 are sealed by a side cover 16, so that the first explosion chamber 1012 of the cylinder seat 10 and the compression chamber 202 and the second explosion chamber 203 of the power wheel 20 are maintained as a closed space. When the power wheel 20 is rotated, the compression chamber 202 and the second explosion chamber 203 on the peripheral surface of the power wheel 20 are configured to be corresponsive to the first explosion chamber 1012, the fuel supply system 12, the compression means 13, the exhaust means 14, and the intake means 15 of the cylinder seat 10, and the fuel gas inputted by the fuel supply system 12 and the fresh air inputted by the intake means 15 are mixed and entered into the compression chamber 202 and the second explosion chamber 203 automatically together with the rotation of the power wheel 20, and the mixed fuel gas will be leak to the outside. In the meantime, the gas barrier member 132 installed at the compression means 13 of the cylinder seat 10 has a forward elastic action force for pressing the peripheral surface of the power wheel 20 anytime. When the gas barrier member 132 is configured to be corresponsive to the compression chamber 202, it will elastically pressed and automatically maintain an airtight effect with the periphery of the compression chamber 202. As the power wheel 20 rotates, the mixed fuel gas entered into the compression chamber 202 will be compressed by the gas barrier member 132 of the compression means 13 to enter into the first explosion chamber 1012. Since the second explosion chamber 203 disposed adjacent to the compression chamber 202 will be configured to be corresponsive to the first explosion chamber 1012 while the power wheel 20 is rotated, so that the mixed fuel gas accommodated in the second explosion chamber 203 and the mixed fuel accommodated in the first explosion chamber 202 will be compressed by the compression means 13 and collected into the first explosion chamber 1012 and the second explosion chamber 203.

Since the total volume of the first explosion chamber 1012 and the second explosion chamber 203 is smaller than the volume of the compression chamber 202, the compressed fuel gas is collected into the first explosion chamber 1012 and second explosion chamber 203 after the fuel gas in the compression chamber 202 is compressed by the compression means 13, so as to facilitate the ignition and explosion.

When the power wheel 20 is turned on and rotated, the compression chamber 202 and the second explosion chamber 203 disposed on the peripheral surface of the power wheel 20 are configured to be corresponsive to the intake means 15 and the fuel supply system 12, the inputted fresh air and fuel gas will be entered and mixed in the compression chamber 202 and the second explosion chamber 203 of the power wheel 20, and the gas barrier member 132 of the compression means 13 is provided for an elastic pressing to maintain the airtight effect of the peripheral surface of the power wheel 20 and the periphery of the compression chamber 202, so that the mixed fuel gas entered into the compression chamber 202 will be compressed forcibly by the gas barrier member 132 of the compression means 13 to enter into the first explosion chamber 1012 as the power wheel 20 rotates. In the meantime, the second explosion chamber 203 disposed adjacent to the compression chamber 202 also rotates with the power wheel 20 and aligns with the first explosion chamber 1012, so that the mixed fuel gas accommodated in the second explosion chamber 203 and the mixed fuel gas accommodated in the first explosion chamber 1012 are compressed by the compression means 13 and collected into the first explosion chamber 1012 and the second explosion chamber 203. Since the total volume of the first explosion chamber 1012 and the second explosion chamber 203 is smaller than the volume of the compression chamber 202, so that the mixed fuel gas compressed by the compression chamber 202 and collected into the first explosion chamber 1012 and the second explosion chamber 203 are in a compressed status. Since the ignition system 11 installed at the cylinder seat 10 is configured to be corresponsive to the first explosion chamber 1012, the compressed fuel gas collected into the first explosion chamber 1012 and the second explosion chamber 203 is ignited by the ignition system 11 instantaneously for an explosion to produce a high explosive yield; and the first explosion chamber 1012 installed at the cylinder seat 10 remains still, and the corresponsive second explosion chamber 203 is installed at the power wheel 20 with a free rotation, so that the compressed fuel gas collected into the first explosion chamber 1012 and the second explosion chamber 203 will be ignited by the ignition system 11 for an explosion to produce a high explosive yield, and a large force is formed naturally and applied to the second explosion chamber 203 to drive the power wheel 20 to rotate at a high speed. The compression means 13 has an exhaust means 14 installed on a side of the compression means 13, so that the compressed fuel gas in the first explosion chamber 1012 and the second explosion chamber 203 will be ignited for an explosion to produce waste gas, and when the power wheel 20 rotates the second explosion chamber 203 to a position corresponsive to the exhaust means 14, the waste gas will be exhausted and discharged to the outside. Therefore, the invention overcomes the poor exhaustion effect of the conventional two-stroke internal combustion engine or the issue of the conventional four-stroke internal combustion engine requiring additional two strokes of the piston and wasting kinetic energy to compress and exhaust the waste gas.

By the rotation of the power wheel 20, the mixed fuel gas supplied from the intake means 15 and the fuel supply system 12 into the compression chamber 202, the mixed fuel gas will be compressed by the compression means 13 and collected into the first explosion chamber 1012 and the second explosion chamber 203, and then ignited by the ignition system 11 for an explosion to produce a large driving force to push the power wheel 20 to rotate, and the power wheel 20 will always rotate unidirectionally and naturally without being affected by the inertia force, so as to achieve the effect of providing high-efficiency kinetic energy.

Figure 4:
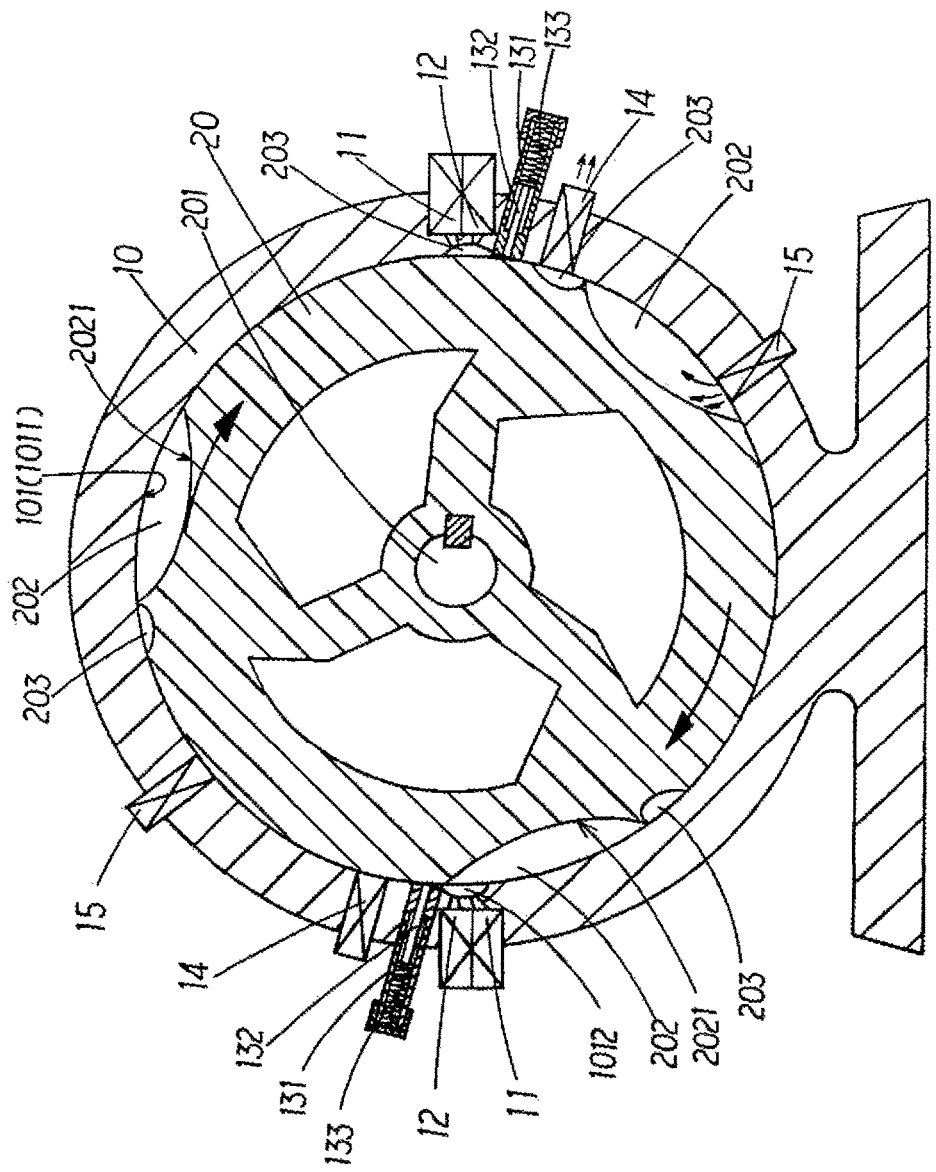
FIG. 4 is a front view of an exhaust means exhausting a gas and an intake means inputting a gas in accordance with an embodiment of the present invention.
Figure 5:
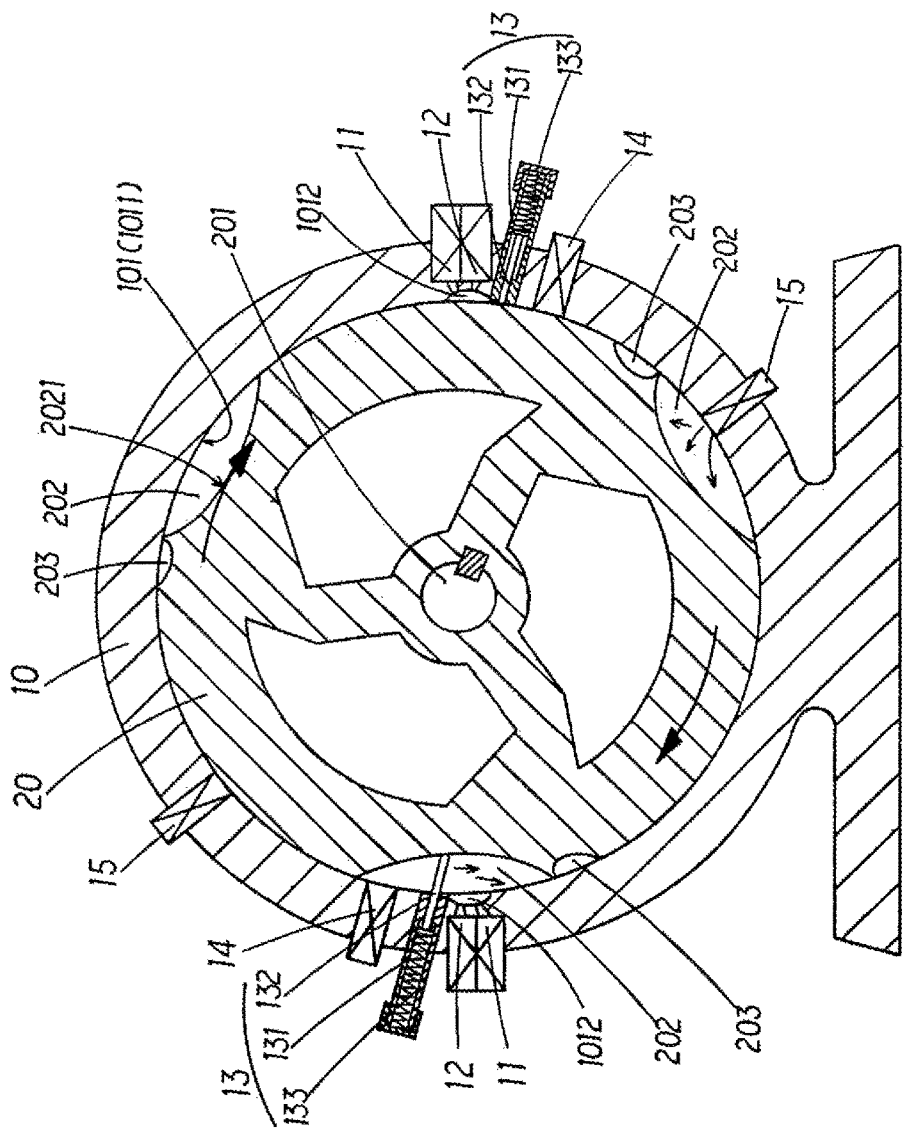
FIG. 5 is a front view of an intake means inputting a gas and a compression means compressing a fuel gas in accordance with an embodiment of the present invention.
Figure 6:
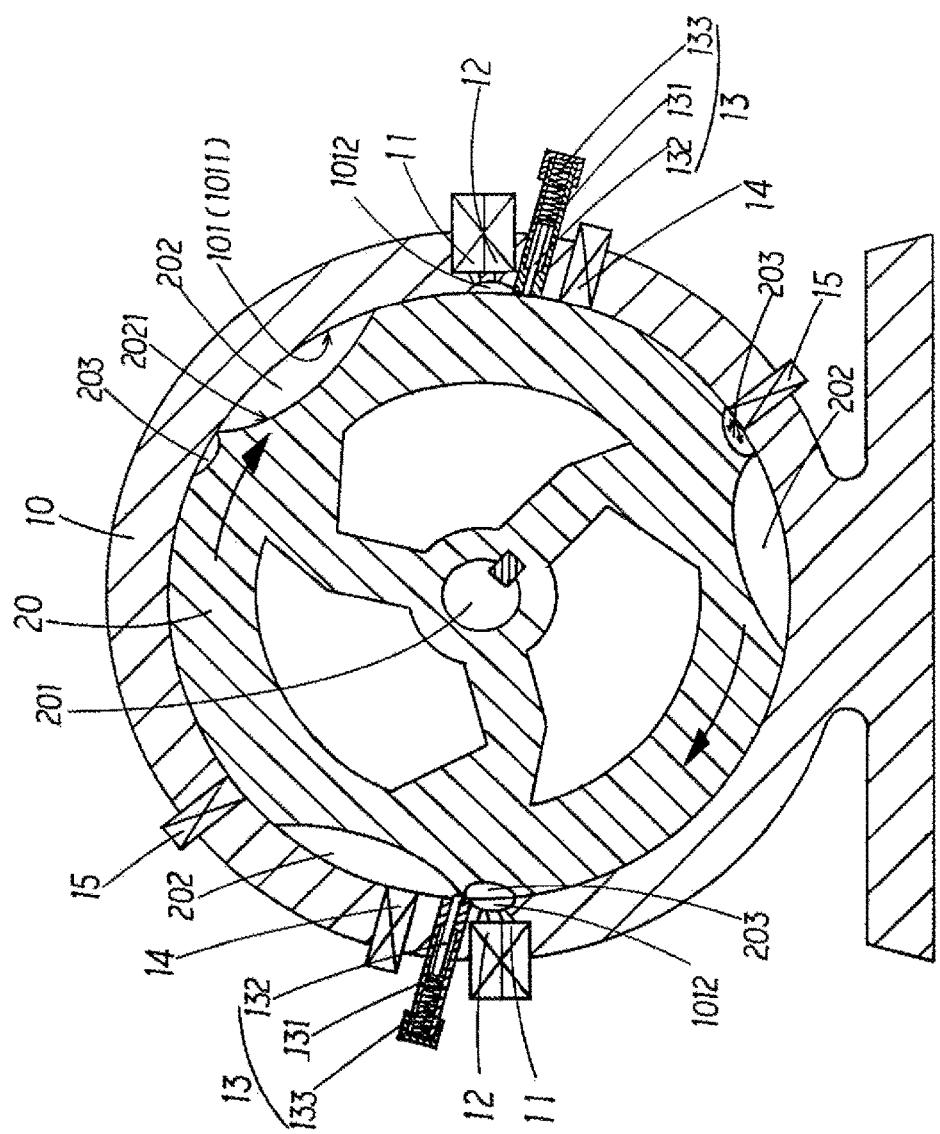
FIG. 6 is a front view of another first explosion chamber operated with respect to a second explosion chamber in accordance with an embodiment of the present invention.

In FIGS. 4, 5, and 6, at least one first explosion chamber 1012 is formed on the peripheral surface of the cylinder wall 1011 of the cylinder seat 10, and at least an ignition system 11, a fuel supply system 12, a compression means 13, an exhaust means 14 and an intake means 15 are installed at the outer periphery of the cylinder seat 10 of each first explosion chamber 1012, and at least one compression chamber 202 and second explosion chamber 203 are disposed on the peripheral surface of the power wheel 20. According to actual requirements, the first explosion chamber 1012, the ignition system 11, the fuel supply system 12, the compression means 13, the exhaust means 14, the intake means 15, the compression chamber 202, and the second explosion chamber 203 may come with a plural quantity, so that the force and speed for driving the power wheel 20 to rotate will be improved to provide a larger quantity of kinetic energy. Since the cylinder 101 of the cylinder seat 10 and the power wheel 20 of the present invention are in a circular shape, the size of the cylinder 101 and the power wheel 20 may be increased to allow the construction of more first explosion chambers 1012, ignition systems 11, fuel supply systems 12, compression means 13, exhaust means 14, intake means 15, compression chambers 202, and second explosion chambers 203, so that the power wheel 20 can provide more and higher-efficiency kinetic energy.

The plurality of first explosion chambers 1012, compression chambers 202, and second explosion chambers 203 are preferably arranged equidistantly on the cylinder wall 1011 and the peripheral surface of the power wheel 20. Preferably, any two equidistant first explosion chambers 1012 are not disposed on diagonals having an angle of 180 degrees with respect to each other, so that the pushing force produced by the explosion of the fuel gas and exerted onto each first explosion chamber 1012 and the second explosion chamber 203 will not be offset, and the unidirectional rotation of the power wheel 20 is maintained smoothly and naturally to achieve the effect of providing high-efficiency kinetic energy.

Since the environment of compressing and igniting the fuel gas varies, the compression chamber 202, and the first explosion chamber 1012 operated with the second explosion chamber 203 are preferably separated, so that the internal combustion engine of the present invention has a diversified fuel supply (in other words, fuels of high ignition point or low ignition point may be used for the operation), so as to achieve the effect of broadening the scope of applicability.

After the compressed fuel gas collected into the first explosion chamber 1012 and the second explosion chamber 203 are exploded and combusted and the produced waste gas is exhausted and discharged to the outside successfully, some of the loosened waste gas may still remain in the space of the second explosion chamber 203, but the remained waste gas is similar to the waste gas remained at the gap between the cylinder and the cylinder cover while the piston of the four-stroke internal combustion engine compresses and exhausts the waste gas, which does not have any substantial effect on exploding and combusting the introduced fresh fuel gas, and thus the invention achieves a full combustion effect and complies with the requirements of pollution protection.

It is noteworthy that the first explosion chamber 1012 is installed to the fixed cylinder seat 10, and the second explosion chamber 203 is movably installed to the freely rotating power wheel 20, so that when the ignition system 11 ignites the compressed fuel gas collected into the first explosion chamber 1012 and the second explosion chamber 203 for an explosion, the fixed first explosion chamber 1012 provides a reaction force of the exploded fuel gas to the second explosion chamber 203 directly, so that after the freely rotating second explosion chamber 203 receives the reaction force, a larger pushing force will be produced to push the power wheel 20 to rotate, so as to improve the efficiency of generating kinetic energy.

In other words, the present invention has the following advantages:

1. The internal combustion engine features simple configuration, and easy and convenient assembling and operation.
2. The internal combustion engine provides high-efficiency kinetic energy.
3. The waste gas of the internal combustion engine can be exhausted successfully and smoothly to achieve a clean effect.
4. The internal combustion engine provides a diversify fuel supply to broaden the scope of applicability.

What is claimed is:

1. A rotary internal combustion engine, comprising:
   a cylinder seat and a power wheel, characterized in that the cylinder seat includes:
   a circular cylinder for accommodating the power wheel;
   at least one or more than one inwardly concave first explosion chamber formed on a peripheral surface of a cylinder wall; and
   at least an ignition system, a fuel supply system, a compression means, an exhaust, and an intake are installed for each first explosion chamber and are located at the external periphery of the cylinder seat and communicated with the cylinder;
   wherein the ignition system is connected to the first explosion chamber;
   the compression means includes an elastically actuated gas barrier member, and the gas barrier member elastically abuts and airtightly seals the peripheral surface of the power wheel;
   the power wheel is freely rotatable and slidably coupled to the circular cylinder of the cylinder seat, and at least one or more than one compression chamber and second explosion chamber disposed adjacent to one another on the peripheral surface of the power wheel; and
   the compression chamber and the second explosion chamber are rotated providing connection to the first explosion chamber, then, the fuel supply system, then the compression means, then the exhaust and then the intake of the cylinder seat;
   wherein, the compression chamber and the second explosion chamber are rotated and provided with fresh air supplied by the intake and the fuel gas inputted by the fuel supply system; and
   the elastically actuated gas barrier of the compression means contacts the compression chamber of the power wheel maintaining a mutual airtight contact.

2. The rotary internal combustion engine according to claim 1, where the compression means comprises:
   an accommodating body;
   the elastically actuated gas barrier member; and
   an elastic member;
   wherein the accommodating body is installed at the cylinder seat, and the elastically actuated gas barrier member is movably contained in the accommodating body, so that a front end of the elastically actuated gas barrier member is exposed from the cylinder wall of the cylinder seat, and the elastic member is accommodated in the accommodating body and elastically pressed against the corresponsive elastically actuated gas barrier member, such that the elastically actuated gas barrier member has an elastic action force for a forward displacement at any time.

3. The rotary internal combustion engine according to claim 1, where the power wheel has a transmission shaft installed at the center of the power wheel, and both sides sealed into the cylinder seat through a side cover.

4. The rotary internal combustion engine according to claim 3, where the cylinder seat includes a positioning frame installed thereon and provided for pivotally installing and positioning the transmission shaft of the power wheel.

5. The rotary internal combustion engine according to claim 1, where the compression chamber of the power wheel has a bottom being a cambered surface.

6. The rotary internal combustion engine according to claim 1, where the compression chamber disposed on the peripheral surface of the power wheel has a volume greater than the sum of the volume of the second explosion chamber disposed on the peripheral surface of the power wheel and the volume of the first explosion chamber of the cylinder seat.

7. The rotary internal combustion engine according to claim 1, where the plurality of first explosion chambers disposed at the circular cylinder of the cylinder seat and the plurality of compression chambers and second explosion chambers disposed on the peripheral surface of the power wheel are arranged equidistant to one another.

8. The rotary internal combustion engine according to claim 7, where any two of the first explosion chambers disposed on the cylinder seat are not disposed at diagonals of 180 degrees with respect to each other.

* * * * *